United States Patent [19]  
Goel

[11] Patent Number: 4,803,257  
[45] Date of Patent: Feb. 7, 1989

[54] FLEXIBLE, STRUCTURAL POLYURETHANE ADHESIVES WITH INITIAL PRESSURE SENSITIVE ADHESIVE PERFORMANCE

[75] Inventor: Anil B. Goel, Worthington, Ohio

[73] Assignee: Ashland Oil, Inc., Ashland, Ky.

[21] Appl. No.: 42,070

[22] Filed: Apr. 24, 1987

[51] Int. Cl.$^4$ .............................................. C08G 18/30
[52] U.S. Cl. ....................................... 528/45; 528/48; 528/59; 528/60; 528/61; 528/66; 528/905
[58] Field of Search ....................... 528/45, 48, 59, 60, 528/61, 66, 905

[56] References Cited

U.S. PATENT DOCUMENTS

| | | | |
|---|---|---|---|
| 3,886,228 | 5/1975 | Bolger | 528/45 |
| 3,912,566 | 10/1975 | Andrews et al. | 528/45 |
| 4,435,558 | 3/1984 | Burba et al. | 528/45 |
| 4,507,412 | 3/1985 | Hickner et al. | 528/45 |
| 4,707,532 | 11/1987 | Goel | 528/45 |

Primary Examiner—John Kight  
Assistant Examiner—S. A. Acquah  
Attorney, Agent, or Firm—John F. Jones

[57] ABSTRACT

A polyurethane adhesive composition which comprises a mixture of a polyisocyanate blocked with a phenolic blocking agent and a polyamine curing agent and optionally may contain a polyepoxide is described.

11 Claims, No Drawings

FLEXIBLE, STRUCTURAL POLYURETHANE ADHESIVES WITH INITIAL PRESSURE SENSITIVE ADHESIVE PERFORMANCE

The present invention relate to polyurethane structural and semistructural adhesives comprising a mixture of a blocked isocyanate prepolymer obtained by the reaction of a poly(alkylene oxide) diol or polyol with a polyisocyanate and a polyamine curing agent.

Two component urethane adhesives are well known (U.S. Pat. Nos. 3,714,127; 3,812,003; 3,886,122; 3,935,051 and 4,444,976 and elsewhere) and are widely used as structural adhesives. Although prior art polyurethane adhesives have been shown to have good flexibility, shock and impact resistance properties and excellent adhesion after curing, these adhesives systems lack the combination of performance properties such as long open time (application time) with good green strength (handling strength) prior to the gelation of the adhesive. Thus, the adhesive systems of the prior art having reasonably long open time not only require preliminary pressure clamping (holding together) of the substrates to be adhered but also require moderately elevated temperatures to high temperatures for curing. In other words, the conventional urethane adhesives either do not have long open time or do not possess the adhesive performance, prior to the gelation, of pressure sensitive adhesives. Structural adhesives, having long open time and excellent adhesive performance similar to a pressure sensitive adhesive during the initial open time based on the blocked isocyanate prepolymers cured with aliphatic polyamines, have not previously been disclosed in the prior art.

Two component urethane adhesives for adhering structural substrates together such substrates including materials like wood, plastics, metals, glass and ceramic materials have been commercially available for more than two decades. The choice of polyurethane adhesives over other classes of adhesives is usually based on their outstanding flexibility, bond strength, shock and impact resistance, durability, chemical inertness and other desirable properties. Generally speaking, conventional polyurethane adhesives are either gravity flowable or highly viscous two-component systems, wherein one component consists of an admixture of a polyhydroxy compound free of isocyanate groups and selected urethane catalyst or catalysts. In addition to this, the polyhydroxy component generally known as the curative component, sometimes consists of a small amount of a low molecular weight (generally less than 400) di- or poly-primary or secondary amine for the purpose of adding sag resistance property (non flowability when applied to a vertical or other non-horizontal surface). Thus, the polyurethane adhesive formed by blending (mixing) the above two components in appropriate mix ratios provide the sag resistant soft adhesive mixture having non-to-poor initial tack and peel strength, which upon heating or standing at room temperature, build adhesion by the curing of polyols with polyisocyanate. Thus, the conventional urethane adhesives described in the prior art do not possess enough green strength to hold the semi-structural and structural parts together during the adhesives open time (working or bonding or assembling or processing time) and require clamping (fastening) of the substrates to be adhered temporarily prior to the heat curing of the adhesive. In other words, the prior art adhesives have no adhesive function at all until they have undergone curing at an elevated temperature or upon long standing at ambient temperatures. Conventional adhesives are capable of bonding the parts once the adhesive has reached the partial gelation state. Stated differently, the conventional polyurethane adhesives generally exhibit two physical stages: i.e., initially the open time stage in which the adhesives are soft, creamy (nongelled form) with no or very poor adhesive strength followed by an infusible gelled stage (without mobility) ultimately giving good peel and shear strengths to the adhered substrates. The in-between stage in which the adhesive remains ungelled and easily processible (bondable) but still providing enough green strength (peel and shear strength) to hold the structural parts together, and also enough strength to break the semi-structural parts upon attempting to peel apart the adhered substrates, generally is either nonexistant or very short lived in the polyurethane adhesives described in the prior art.

There is a need for a flexible structural adhesive having a long open time with good immediate green strength property which can provide long processing time freedom requiring no pressure clamping of adherends together and which, upon curing either at room temperature or at low heat, exhibit structural adhesive properties with high flexibility and thus can be used in bonding of flexible substrates.

Furthermore, as is well known, the free isocyanate groups containing polyurethane adhesive materials are highly toxic and are also known to react with moisture thus causing foaming in the cured adhesive compositions, particularly when used under high humidity conditions.

The objective of this invention is to develop a highly flexible structural adhesive having long open time which exhibits tack and peel strengths prior to becoming the fully structural adhesive using non-free isocyanate based material which are less sensitive to moisture. In other words, this invention provides a structural adhesive with initial pressure sensitive adhesive performance so that it provides the long application time freedom and eliminates the need for longer time clamping of the substrates.

I have discovered that when a blocked isocyanate prepolymer of molecular weight ranging from about 500 to about 10,000 and preferably from about 1,000 to about 10,000 obtained by the reaction of a poly(alkylene oxide) polyol and preferably a diol or triol with a diisocyanate in equivalent ratio of two isocyanate groups per hydroxy group followed by capping the remaining isocyanate groups with phenolic blocking agents such as phenol, nonylphenol, cresol, naphtol, alkyl, phynols, alkoxy phenols and the like is mixed with a polyamine (preferably aliphatic primary and secondary group containing polyamines), a flexible structural adhesive composition is obtained which exhibits a long open time with excellent tack and peel strength prior to full gelation or cure. The adhesive compositions of this invention can either be partially cured at room temperature under atmospheric conditions without the disadvantage of foaming that is usually associated with polyisocyanate based polyurethane adhesives and moreover, the coatings or the adhesives of this invention can also be partially cured at low-to-moderately elevated temperatures (below about 100° C.) in a rapid fashion to give a partially cured adhesive composition within a few minutes (less than 30 minutes in most cases) which exhibits properties similar to those of pressure sensitive adhesives having excellent tack, peel and shear strengths. These compositions cure at room temperature to reach the full strength of a structural adhesive useful for flexible substrates. The physical nature of the compositions of this invention differ from those usually observed in the prior art polyurethane adhesives which upon partial curing give non-tacky, rigid, thermoset bonds.

The use of polyurethane polymers obtained by the curing of blocked isocyanate prepolymers with aliphatic polyols or polyamines in various applications (most commonly in coatings) has been described extensively in the prior art [for instance, "Progress in Organic Coatings, 9, (1981) 3–28, and references cited therein].

In the compositions of this invention it has been found that the pressure sensitive adhesive properties, during the partially curing stage, are usually obtained when the blocked isocyanate prepolymers are composed of poly (alkylene oxide) chains in the backbone or the polyamines used for curing contain poly(alkylene oxide) chains in the backbone. Furthermore, it has been discovered that the use of small amounts (up to 25% by weight of total adhesive composition) of polyepoxy resins, especially those containing glycidyl ether groups, in the compositions provides improved tack, peel and shear strengths during the partially cured stages, thus providing excellent pressure sensitive adhesive properties.

As is well known in the art, small amounts of catalysts (such as tertiary amine catalysts or organometallic catalysts) may be used to improve the cure speed of the adhesive compositions of this invention if desired. The use of organic solvents to reduce the viscosity of the ungelled adhesive system is within the scope of this invention. The adhesive compositions of this invention may include fillers such as talc, kaolin, metal oxides, calcium carbonate, silica, alumina and the like.

Although the adhesive compositions of this invention can be used as a single component, the single component usually only provides room temperature pot life of a day or less, and thus it is preferred in many cases to use the adhesive in the form of a two component system. Thus, one component is made up of a blocked polyisocyanate prepolymer blocked with a phenolic compound which advantageously may contain a polyepoxide (up to 30% by weight), and the second component contains a polyamine which can optionally be mixed with a polyol.

The preferred polyamines useful as curing agents for this invention are aliphatic polyamines containing primary and/or secondary amine functionality. These polyamines may also contain tertiary amine groups in the backbone. Some representative polyamines useful in this invention are ethylene diamine, propylene diamine, hexamethylene diamine, bis(aminomethyl) cyclohexane, dimer acid diamine, diethylene triamine, dipropylene triamine, triethylene tetramine, tetraethylene pentamine, aminoethylpiperazine, bis(aminopropyl) piperazine, poly(alkylene oxide) di- or triprimary amine (molecular weight ranging from 200 to 10,000), poly amido amines and the like.

Polyisocyanates which are polymeric in nature including isocyanate prepolymers of all types are included in this invention.

The optional polyepoxides which may be used in the compositions of this invention are any of the well known polyepoxides containing more than one group of the type per molecule.

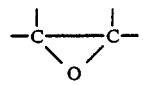

This invention is further illustrated in the following representative examples.

EXAMPLE 1

A nonyl phenol blocked polyisocyanate prepolymer (average blocked NCO functionality of 2.7 per molecule and NCO equivalent weight of approximately 1750) (17.5g) obtained by the reaction of toluene diisocyanate with poly(propylene oxide) polyol (approximately 1:1 by weight mixture of diol and triol) in functionality ratio of 2 NCO groups per hydroxyl group, followed by capping with nonyl phenol, was mixed with 0.43 g of diethylene triamine. The resulting mixture was applied as approximately 1–2 mils thick film on two Mylar (polyester) sheets. One sheet was kept at room temperature for curing and the other sheet was kept at 50° C. for 10 minutes during which time the adhesive reached a semi-gelled stage. The heat cured adhesive film, having no observable bubbles, was tested for pressure sensitive adhesion towards a stainless steel plate. It was found to have a Polyken Probe tack (ASTM D-2979) of 560, 180° peel (PSTC-1) of 60 oz.-/in. and 500 g shear resistance (PSTC-7) of 6 hours. This heat cured adhesive film was tested again after storing at room temperature for four hours and showed Polyken Probe tack of 500, 180° peel of 58 oz./in. and 500g shear resistance of greater than 24 hours (no slippage). After further storage at room temperature this material showed a tack of 300, a peel strength of 18 oz./in. and 500 g and 1000 g shear resistance of greater than 24 hours (no slippage). The adhesion testing of this heat cured film, cured at 50° C. for 10 minutes, was carried out periodically during the 24 hour period using polyester foam backed polyester cloth generally used as a headliner in the automotive industry for auto interiors. Testing was carried out (1) immediately after curing at 50° C., (2) after keeping at room temperature for one hour, (3) after four hours, (4) after 10 hours and (5) after 20 hours all showed fiber failure, indicating the long bonding time freedom after the adhesive application. The adhesive containing sheet which was stored at room temperature showed a Polyken Probe tack of 720, 180° peel strenth of 59 oz./in. and a 500 g shear resistance greater than 24 hours (no slippage), thus indicating the curing took place under ambient conditions without bubbles formation. The polyester cloth, when tested for adhesion to this material also showed fiber failure.

EXAMPLE 2

The procedure of Example 1 was followed using 17.5 g of the blocked polyisocyanate prepolymer and 0.37 g of triethylene tetramine. The eight minute 50° C. cured adhesive film showed a tack of 400, 180° peel of 40 oz./in. and 500g shear resistance of greater than 24 hours (no slippage). The room temperature cured sample when tested after seven hours of curing showed tack of 590, peel strength of 46 oz./in. Both room temperature cured and 50° C. for eight minutes cured samples showed excellent adhesion towards the polyester foam backed polyester fabric showing foam/fabric interface delamination upon attempted peeling.

EXAMPLE 3

This example demonstrates that the inclusion of small amounts of a polyepoxide in the adhesive formulation of Example 1 results in significant improvement in the adhesion performance of the resulting adhesive. The procedure of Example 1 was followed using 17.5 g of the blocked polyisocyanate prepolymer of Example 1 mixed with 1.6 g of poly(propylene oxide) diol diglycidyl ether (epoxy equivalent weight of 320) and was mixed with 0.45 g of diethylene triamine. The sample which was cured at 50° C. for 15 minutes was tested for pressure sensitive adhesion and showed a tack of 740, 180° peel strength of 118 oz./in. and 500g and 1000g shear resistance of greater than 24 hours (no slippage). This sample, when tested after keeping for 2-5 hours at room temperature followed by curing at 50° C. showed tack of 700, 180° peel strength of 50 oz./in. and 1000g shear resistance greater than 24 hours (no slippage). These results indicate that the inclusion of polyepoxide helps to improve the adhesion towards polyester foam backed fabric showing fabric delamination upon testing after 20 hours of curing.

EXAMPLE 4

The procedure of Example 1 was followed using 17.5 g of blocked polyisocyanate prepolymer blended with 1 g of liquid diglycidyl ether of Bisphenol-A and cured with 0.49 g of diethylene triamine. The room temperature cured sample showed good adhesive towards polyester foam backed polyester fabric to cause substrate delamination after three hours of curing. This sample which was cured at room temperature showed tack of 550, 180° peel strength of 70 oz./in. and 500g and 1000g shear resistance of greater than 24 hours (no slippage) when tested after six hours of curing. A 54° C. cured sample for 20 minutes showed tack of 740, 180° peel of 96 oz./in. and shear resistance (500 and 1000 g) of greater than 24 hours when tested after one hour at room temperature after curing. The same sample, after keeping at room temperature for six hours, showed tack of 480, peel strength of 52 oz./in. and showed no slippage of 500 g and 1000 g shear resistance. The adhesive also resulted in polyester fabric delamination when tested for adhesion. These results show that the presence of a polyepoxide in the adhesive composition improves the adhesion performance.

EXAMPLE 5

The procedure of Example 1 was followed using 17.5 g of the blocked polyisocyanate prepolymer mixed with 1.6 g of poly(propylene oxide) diol diglycidyl ether (epoxy equivalent weight of 320) and cured with 0.35 g of diethylene triamine and 0.2 g of bis(aminopropyl) piperazine. The room temperature cured adhesive showed enough adhesive strength so that the polyester fabric delaminated when the strength of the bond was tested. The 5.5 hour room temperature cured sample showed tack of 630, 180° peel strength of 82 oz./in. and 500g shear resistance was greater than 24 hours (no slippage). The sample, when cured at 54° C., cured in 15 minutes to give a pressure sensitive adhesive performance of tack 600 and 180° peel strength of 84 oz./in. The sample had a tack of 400, 180° peel strength of 30 oz./in. and 500 g shear resistance of greater than 24 hours after five hours at room temperature. These results indicate that use of tertiary amino group containing amines results in faster curing of the adhesive system.

EXAMPLE 6

The procedure of Example 1 was followed using 12 g of blocked polyisocyanate prepolymer and 0.92 g of poly (propylene oxide) triamine (molecular weight of 400). The 58° C. cured sample for 10 minutes showed good adhesion towards polyester fabric showing delamination of the fabric when the bond was tested.

EXAMPLE 7

The procedure of Example 1 was followed using 11 g of blocked polyisocyanate prepolymer and 1 g of dimer acid diamine. The room temperature cured sample, after one hour, showed tack of 340 and peel strength of 18 oz./in. The sample tested for shear resistance after three hours of curing showed no slippage of 500 g.

EXAMPLE 8

The procedure of Example 1 was followed using 17.5 g of blocked polyisocyanate, 0.25 g of diethylene triamine and 2 g of poly(propylene oxide) triamine (molecular weight of 3100). The sample, after curing at 50° C. for 15 minutes, showed a tack of 520, 180° peel strength of 25 oz./in. and 500g shear resistance of greater than 24 hours (no slippage). The polyester fabric resulted in delamination upon testing during the time period of up to 20 hours.

EXAMPLE 9

A semi-structural, highly flexible adhesive composition was formulated using a talc filled resin component composed of 75.7 parts by weight of the nonyl phenol blocked polyisocyanate prepolymer of Example 1, 4.3 parts by weight of the liquid glycidyl ether of Bisphenol-A and 20 parts by weight of talc. A portion (11.5 g) of this component was mixed with 0.5g of the curative component obtained by mixing 50 parts by weight of diethylene triamine with 50 parts by weight of talc, and the resucting adhesive was applied between fiberglass reinforced polyester sheet (SMC) substrates (a 1 inch wide and 4 inches long coupon covering a 1 square inch bond area, 30 mils thick glue line). These coupons were cured at 200° F. for 5 minutes followed by 30 minutes post curing at 260° F. The lap shear (ASTM D-1002) strength was 260 psi (an average of three bonds tested). This adhesive when used to adhere plywood sheets together showed substrate failure when the cured sheet sandwich was pulled apart. When this adhesive was applied to an aluminum sheet which was then bonded to a polyester foam sheet and cured testing of the adhesive bond resulted in delamination of the foam and not the adhesive bond. Similar results were obtained when an isocyanurate foam was bonded to an aluminum sheet with the adhesive of this example.

I claim:

1. A polyurethane structural adhesive having initial pressure sensitive adhesive performance comprising a mixture of a blocked polyisocyanate and a polyamine curing agent wherein the polyisocyanate is a prepolymer obtained by the reaction of a poly (alkylene oxide) polyol with a polyisocyanate and said prepolymer is blocked with a phenolic blocking agent selected from the group consisting of phenol, nonylphenol, cresol, napthol, an alkyl phenol and an alkoxy phenol and the polyamine curing agent is selected from the group consisting of ethylene diamine, propylene diamine, hexamethylene diamine, bis (aminomethyl) cyclohexane, dimer acid diamine, diethylene triamine, dipropylene triamine, triethylene tetramine, bis (aminopropyl) piperazine, poly (alkylene oxide) diamines and poly (alkylene oxide) triamines.

2. The composition of claim 1 wherein the prepolymer has a molecular weight in the range of from about 500 to about 10,000.

3. The composition of claim 2 wherein there is also present up to 25% by weight of a polyepoxy resin.

4. The composition of claim 1 wherein the polyisocyanate prepolymer is the reaction product of a poly(propylene oxide) polyol and toluene diisocyanate and the blocking agent is nonyl phenol.

5. The composition of claim 4 wherein the polyamine is diethylene triamine.

6. The composition of claim 4 wherein the polyamine is triethylene tetramine.

7. The composition of claim 5 wherein there is also included the diglycidyl ether of poly(propylene oxide) diol.

8. The composition of claim 5 wherein there is also included the diglycidyl ether of Bisphenol-A.

9. The composition of claim 4 wherein the polyamine is poly(propylene oxide) triamine.

10. The composition of claim 4 wherein the polyamine is dimer acid diamine.

11. The composition of claim 5 wherein there is also included as polyamine poly(propylene oxide) triamine.

* * * * *